United States Patent [19]

Takahashi et al.

[11] Patent Number: 5,585,060
[45] Date of Patent: Dec. 17, 1996

[54] PROCESS FOR PREPARING BIODEGRADABLE WATER-RESISTANT FILM

[75] Inventors: Hidekazu Takahashi; Kohji Yamada; Norimasa Yanai, all of Chiba, Japan

[73] Assignee: Showa Sangyo Co. Ltd., Tokyo, Japan

[21] Appl. No.: 447,052

[22] Filed: May 22, 1995

Related U.S. Application Data

[62] Division of Ser. No. 194,569, Feb. 10, 1994, Pat. No. 5,456,941.

[30] Foreign Application Priority Data

Feb. 10, 1993 [JP] Japan ................................ 5-22512

[51] Int. Cl.$^6$ ............................................ B29C 41/12
[52] U.S. Cl. ................. 264/204; 264/202; 264/211.11; 426/656; 530/373
[58] Field of Search .................................. 264/204, 202, 264/211.11, 233; 426/656; 530/373

[56] References Cited

U.S. PATENT DOCUMENTS

| | | | |
|---|---|---|---|
| 2,238,591 | 4/1941 | Horesi et al. | 264/202 |
| 2,322,928 | 6/1943 | Drewsen et al. | 427/338 |
| 2,331,434 | 10/1943 | Sitzler | 264/202 |
| 2,552,079 | 5/1951 | Yelland et al. | 264/202 |
| 2,854,345 | 9/1958 | McDowell | 264/202 |
| 3,535,305 | 10/1970 | Carter et al. | 260/123 |
| 3,645,760 | 2/1972 | O'Brien et al. | 427/338 |
| 4,009,313 | 2/1977 | Crawford et al. | 428/290 |
| 5,260,396 | 11/1993 | Kroner et al. | 527/201 |
| 5,342,923 | 8/1994 | Takahashi et al. | 530/373 |
| 5,367,055 | 11/1994 | Takahashi et al. | 426/656 |
| 5,397,834 | 3/1995 | Jane et al. | 525/54.1 |

FOREIGN PATENT DOCUMENTS

| | | | |
|---|---|---|---|
| 548248 | 10/1942 | United Kingdom | 427/338 |
| 817724 | 8/1959 | United Kingdom | 264/202 |

*Primary Examiner*—Jeffery R. Thurlow
*Attorney, Agent, or Firm*—Sughrue, Mion, Sinn, Macpeak & Seas

[57] ABSTRACT

A process for preparing a biodegradable water-resistant film. The process includes the steps of dispersing zein in an aqueous solution comprising acetone in an amount of from 65 to 75% by volume to form a zein dispersion, forming the resulting zein dispersion into a film, and drying the film in an atmosphere having a relative humidity of 85% or less at an initial temperature of 55° C. or less. The present invention also relates to a method for imparting water resistance to an article with poor water resistance by coating the article with the zein dispersion prepared as above, and drying the coated zein dispersion under the above conditions. The film or coating film according of the present invention neither dissolves upon contact with water, nor becomes weak due to water absorption or swelling on contact with water.

3 Claims, No Drawings

PROCESS FOR PREPARING BIODEGRADABLE WATER-RESISTANT FILM

This application is a division of U.S. application Ser. No. 08/194,569, filed Feb. 10, 1994, now U.S. Pat. No. 5,456,941.

FIELD OF THE INVENTION

This invention relates to a process for preparing a water-resistant biodegradable film and to application of the biodegradable film to a biodegradable but non-water-resistant article to render it water-resistant.

BACKGROUND OF THE INVENTION

With the recent increase of consciousness of the importance of environmental conservation and environmental purification, studies for replacing conventional every-day materials with those made of biodegradable materials have been conducted on a world-wide scale.

Among biodegradable materials which have been proposed to date, starch-type naturally-occurring substances have poor water resistance; thus, their use is somewhat confined from a practical perspective. Imparting water resistance to such biodegradable materials would broaden their application and furnish solutions to various problems confronting the environment, particularly in terms of waste disposal.

Articles with poor water resistance may be coated to waterproof them. In taking this approach, it is required to establish a technique for producing with ease a biodegradable thin film which exhibits sufficient water resistance so as not to absorb water, not to become swollen with water and not to be weakened even when contacted with water for a long time. In particular, films made of a naturally-occurring substance which are completely degradable have been attracting considerable attention.

However, currently available biodegradable films made of naturally-occurring substances are strictly limited in their use due to their poor water resistance. Therefore, such materials are virtually impractical for use as containers for foods having a significant water content.

ZEIN, a catalogue published by Freeman Industries, Inc. discusses zein, a main protein of corn (Zea mays), as a coating material. Although zein itself and films of zein prepared in a known manner do not dissolve in water, zein and films thereof are known to absorb water, and thus become weak. Therefore, conventional zein films are not water-resistant and find little, if any, practical utility.

SUMMARY OF THE INVENTION

An object of the present invention is to provide a process for preparing a biodegradable film or coating which neither dissolves in water nor weakens through water absorption and swelling, and which can be used as a wrapping material for food, or as a coating material for food (e.g., chocolate, gelatin capsule or enteric agent) or other articles (e.g., containers for foods).

Another object of the present invention is to provide a method for rendering a biodegradable article water-resistant by coating it with the biodegradable film described herein.

The above and other objects and advantages in accordance with the present invention can be attained by a process for preparing a biodegradable water-resistant film comprising dispersing zein in an aqueous solution comprising acetone in an amount of from 65 to 75% by volume to form a zein dispersion (which may alternatively be characterized as a "dispersed system"), forming the zein dispersion into a film, and drying the film in an atmosphere having a relative humidity (RH) of 85% or less at an initial temperature of 55° C. or less. The biodegradable film itself, produced in the above manner, is also a part of the present invention.

The present invention also provides a method for rendering a biodegradable article water-resistant which comprises coating the surface of a biodegradable article with a zein dispersion prepared by dispersing zein in an aqueous solution comprising 65 to 75% by volume acetone and drying the coated zein in an atmosphere having a relative humidity of 85% or less at an initial temperature of 55° C. or less.

DETAILED DESCRIPTION OF THE INVENTION

Zein is a known protein of corn or maize. It can be characterized as a prolamine and contains no tryptophanol, cystine or lysine. According to Swallen, *Industrial and Engineering Chemistry*, Vol. 33 (3), pp. 394–398 (1941), zein is generally considered to be a hydrophobic protein and is soluble in a water-containing organic solvent, e.g., ethyl alcohol or acetone. Further, according to Wilson's cylindrical molecular model (TIBS-July, pp. 306–308 (1984)), zein comprises about 40% of hydrophilic amino acids which are regularly orientated in the molecules to form a hydrophilic region.

The present inventors theorized that both the hydrophobic region and also the hydrophilic region of zein should be stabilized in order for zein to be dissolved in a water-containing organic solvent, and that water provides such a stabilizing effect. As a result of various investigations based on this theory, the inventors have determined that a dispersed system having a specific water to organic solvent ratio can cause an amphipathic protein, such as zein, to be orientated so as to have a water-resistant structure upon evaporation of the solvent. A film with markedly improved water resistance can thus be obtained by maintaining a dispersed system of an amphipathic substance at such a specific water/organic solvent ratio for a time sufficient for the molecules to become orientated into a water-resistant structure in which the hydrophobic region thereof faces outside with little hydrophilic region thereof being in contact with water. In other words, the hydrophilic property and hydrophobic property of an amphipathic substance can be controlled by purely physical means, such as proper choice of the water to organic solvent ratio of drying conditions, etc. This theory is believed to be responsible for the remarkable effects of the invention.

In the present invention, zein is dispersed in a 65 to 75 vol % acetone aqueous solution to prepare a zein dispersion. A preferred zein concentration in the dispersion is from 5 to 20 w/v %. The zein should remain in the dispersed system for a time sufficient for the molecules to become orientated into a water-resistant steric structure.

In order that the zein molecules may remain in the desired steric orientation during drying, drying conditions should be so selected as to achieve well-balanced evaporation of water and acetone. In order to accelerate evaporation chiefly of water, it is necessary to conduct drying in an atmosphere having a relatively humidity of not more than 85%, preferably 20 to 70%. Further, abrupt evaporation of acetone should be avoided by starting the heating from a temperature of not higher than 55° C., preferably 20° to 40° C. Under these drying conditions a practical water-resistant zein film can be formed.

The "water-resistant" film as used herein means a film having a considerable barrier property against permeation of water as a liquid. In other words, the film does not dissolve in water and hardly suffers from disintegration or reduction in physical strength, even when brought into contact with water for a relatively long time.

Drying of the coating film may be carried out either under atmospheric pressure or under reduced pressure. Adjustment of these drying conditions is preferably made by means of a thermo-hygrostat, a pressure reducing apparatus, etc.

The term "biodegradable" film or article as used herein means a film or article which is capable of degrading (or being degraded), for example, with a microorganism, and its biodegradability can be confirmed in accordance with an ordinary digestion test using a digestive enzyme such as pepsin or $\alpha$-chymotrypsin.

The present invention will now be illustrated in greater detail with reference to Examples, but it should be understood that the present invention is not construed as being limited thereto.

EXAMPLE 1

One gram of zein (ZEIN DP manufactured by Showa Sangyo Co., Ltd.) was dispersed in 10 ml of a 70 v/v % acetone aqueous solution and heated in a thermostat at 70° C. for 5 min to be completely dissolved. The dispersion was taken out of the thermostat and cooled to 30° C. The dispersion was cast on a plastic sheet placed on a hot plate and preheated to 30° C. over a casting area of 120 cm$^2$ in a thermo-hygrostat kept at 25° C. and 70% RH, and the cast film was dried for 6 hours to obtain a transparent film having an average thickness of 70.2 μm.

EXAMPLE 2

A zein film was prepared in the same manner as in Example 1, except that the cast film was dried at 28° C. and 20% RH for 3 hours, and then dried at 60° C. and 20% RH for 1 hour to obtain a transparent film having an average thickness of 68.8 μm.

COMPARATIVE EXAMPLE 1

A zein film was prepared in the same manner as in Example 1, except that drying of the cast film was carried out in a thermo-hygrostat kept at 60° C. and 10% RH.

COMPARATIVE EXAMPLE 2

A zein film was prepared in the same manner as in Comparative Example 1, except for replacing the acetone aqueous solution with a 80 v/v % aqueous solution of ethyl alcohol.

COMPARATIVE EXAMPLE 3

The same procedure as in Example 1 was repeated, except for replacing the acetone aqueous solution with a 80 v/v % aqueous solution of ethyl alcohol.

Each of the films prepared was firmly held in place between two silicon O-rings having a diameter of 8 cm, and a water tube having a height of 60 cm was placed at the center of the film. Water absorption (a state that absorbs water but does not become weak) and water swelling (a state that causes increase in volume, weakening or deformation) of the film was observed, and the time required for water to seep through the film to the reverse side was measured. The results of observation were evaluated according to the following rating system as shown in Table 1. It should be noted that water resistance of the zein film or the rate of seeping of water through the zein film varies depending on the film thickness and is not therefore limited to the results shown in Table 1.

Rating System:
1. No change was observed.
2. Slight change due to water absorption or swelling was observed.
3. Significant change of the film was observed, and water had seeped through to the reverse side.
4. The film disintegrated.

TABLE 1

|  | Example 1 | Example 2 | Compar. Example 1 | Compar. Example 2 | Compar. Example 3 |
|---|---|---|---|---|---|
| Film formation Property | good | good | excellent | excellent | incapable of film formation |
| Water absorption: |  |  |  |  |  |
| after 5 mins. | 1 | 1 | 2 | 3 |  |
| after 1 hr. | 1 | 1 | 3 | 3 |  |
| after 3 hrs. | 2 | 2 |  |  |  |
| after 40 hrs. | 3 | 3 |  |  |  |
| Water swelling: |  |  |  |  |  |
| after 5 mins. | 1 | 1 | 1 | 3 |  |
| after 1 hr. | 1 | 1 | 2 | 3 |  |
| after 3 hrs. | 2 | 2 |  |  |  |
| after 40 hrs. | 2 | 2 |  |  |  |
| Seeping of water: |  |  |  |  |  |
| after 5 mins. | 1 | 1 | 1 | 1 |  |
| after 1 hr. | 1 | 1 | 3 | 4 |  |
| after 3 hrs. | 1 | 1 |  |  |  |
| after 40 hrs. | 3 | 3 |  |  |  |

EXAMPLE 3

One gram of zein was dispersed in 10 ml of a 70 v/v % acetone aqueous solution and heated in a thermostat at 70° C. for 5 min to be completely dissolved. The dispersion was taken out of the thermostat and cooled to 30° C. The dispersion was coated on the entire inner surface of a bowl-shaped wafer made from glutinous rice flour (in the form of a Japanese confectionery called "MONAKA", in which sweetened bean paste is stuffed) having a thickness of 2.5 mm and an inner surface area of 80 cm$^2$ at a spread thickness of 2.5 ml/80 cm$^2$ with a brush. The coated wafer was dried in a thermo-hygrostat kept at 30° C. and 55% RH.

COMPARATIVE EXAMPLE 4

One gram of zein was dispersed in 10 ml of a 80 v/v % ethyl alcohol aqueous solution and heated in a thermostat at 70° C. for 5 min to be completely dissolved. The dispersion was taken out of the thermostat and cooled to 30° C. The dispersion was coated on the entire inner surface of a bowl-shaped wafer of the same type and in the same manner as in Example 3, and the coated wafer was dried in a thermo-hygrostat kept at 60° C. and 10% RH.

35 ml of water was placed into each of the bowl-shaped coated wafers of Example 3 and Comparative Example 4, and into a non-coated wafer for comparison, at a temperature of 20° C., and the time for water to seep through the wafer was measured. The results obtained are shown in Table 2 below.

TABLE 2

| Example 3 | Compar. Example 4 | Untreated Wafer |
|---|---|---|
| 15 hrs. | 8 mins. | instantaneously disintegrated |

As described above, the film or coating film according to the present invention neither dissolves in upon contact with water, nor becomes weak due to water absorption or swelling on contact with water for an extended period of time. Being made from zein, it is biodegradable. Accordingly, the present invention makes it possible to produce a biodegradable film with which a food product can be directly wrapped, or a food product or other articles can be coated, thus furnishing a biodegradable material meeting the current demand for environmental conservation and purification.

While the invention has been described in detail and with reference to specific examples thereof, it will be apparent to one skilled in the art that various changes and modifications can be made therein without departing from the spirit and scope thereof.

What is claimed is:

1. A process for producing a biodegradable water-resistant wrapping film for a food product comprising dispersing zein in an amount of from 5 to 20 w/v % in an aqueous acetone solution of 65 to 75% by volume to form a zein dispersion, forming the zein dispersion into a film, and drying the film in an atmosphere having a relative humidity of 85% or less at an initial temperature of 55° C. or less.

2. A process for producing a biodegradable water-resistant wrapping film for a food product comprising the steps of:

(a) dispersing zein in an amount of from 5 to 20 w/v % in an aqueous acetone solution of 65 to 75% by volume to form a zein dispersion;

(b) forming the zein dispersion into a film, and (c) drying the film under atmospheric pressure in an atmosphere having a relative humidity of 85% or less at an initial temperature of 55° C. or less, wherein the molecules of the zein are oriented to have a water resistant structure.

3. A process for producing a biodegradable water-resistant wrapping film for a food product comprising the steps of:

(a) dispersing zein in an amount of from 5 to 20 w/v % in an aqueous acetone solution of 65 to 75% by volume to form a zein dispersion;

(b) forming the zein dispersion into a film, and (c) drying the film under reduced pressure in an atmosphere having a relative humidity of 85% or less at an initial temperature of 55° C. or less, wherein the molecules of the zein are oriented to have a water resistant structure in which the hydrophobic region thereof faces outside.

* * * * *